Jan. 4, 1955  S. C. PEEK, JR., ET AL  2,698,501
APPARATUS FOR BENDING LINEAR GLASS TUBING
Filed Dec. 13, 1950  5 Sheets-Sheet 5
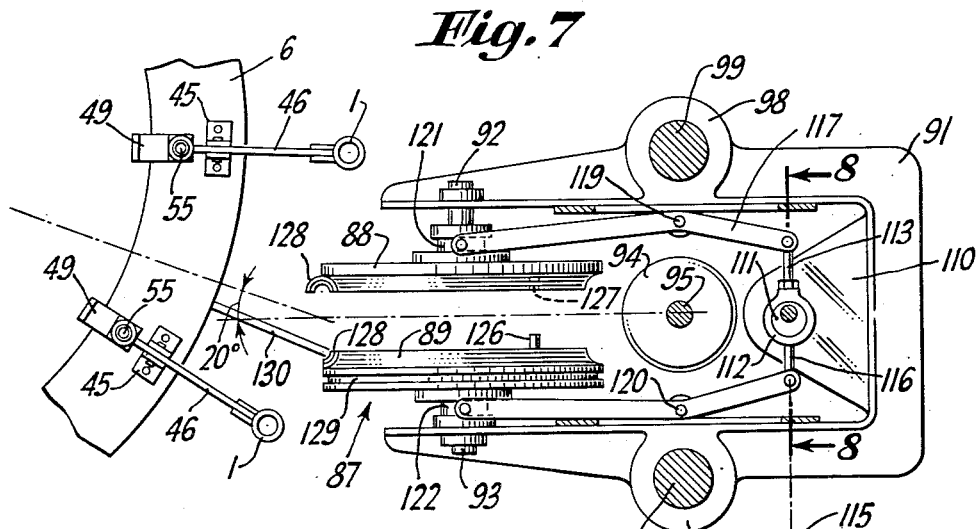
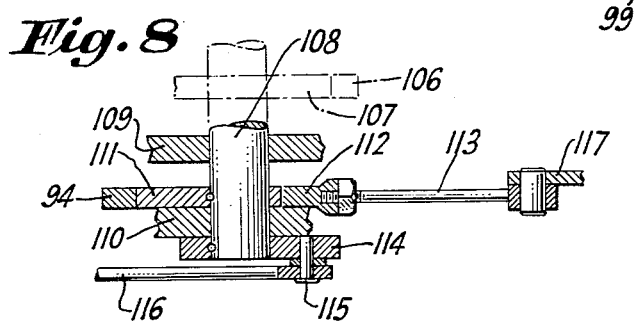
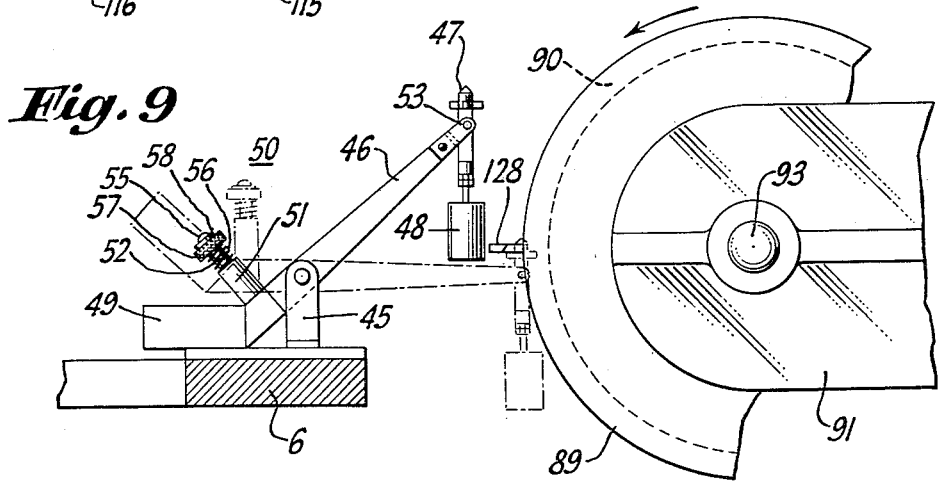
INVENTORS
SANDFORD C. PEEK JR.
ORRICK H. BIGGS
BY
Joseph C. Ryan
ATTORNEY

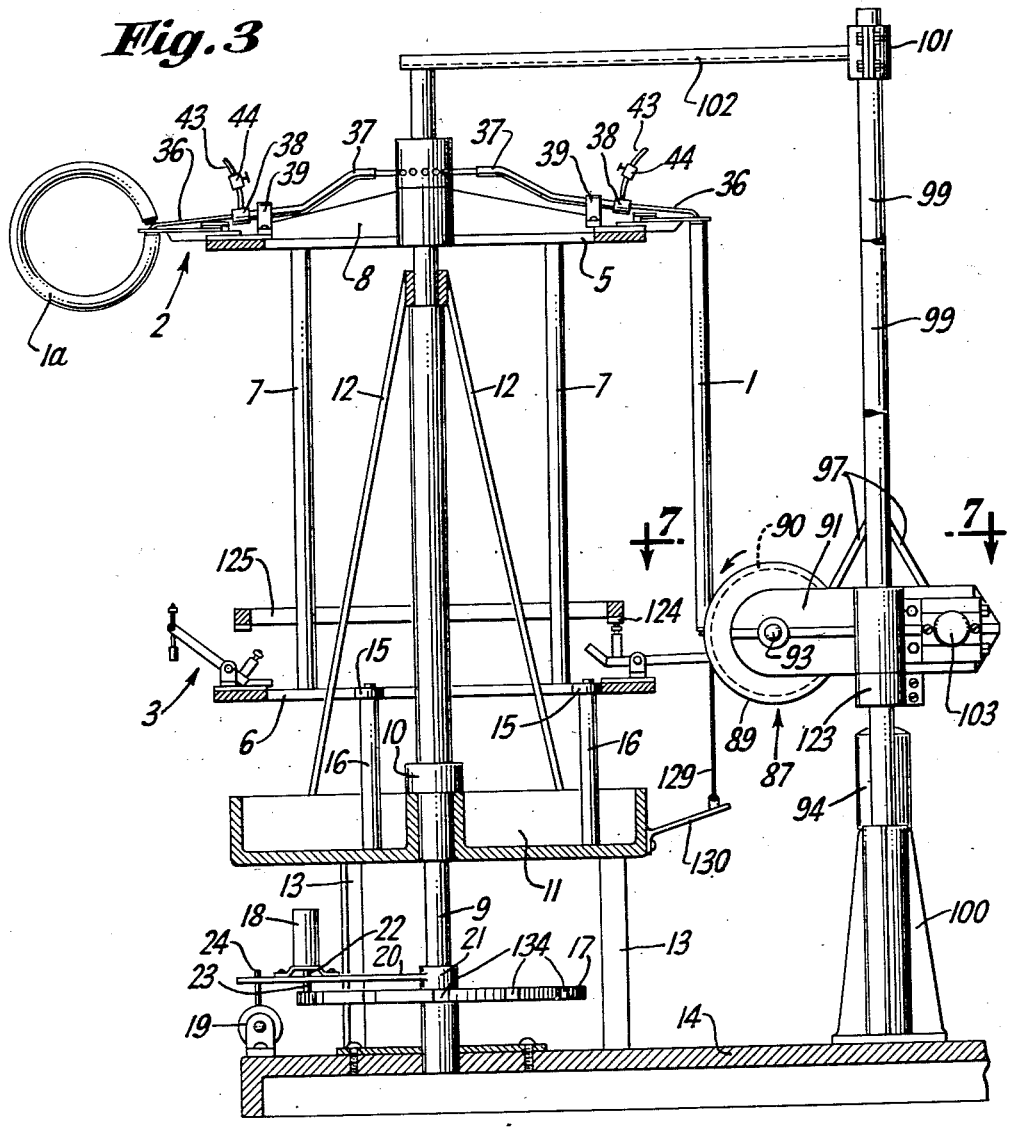

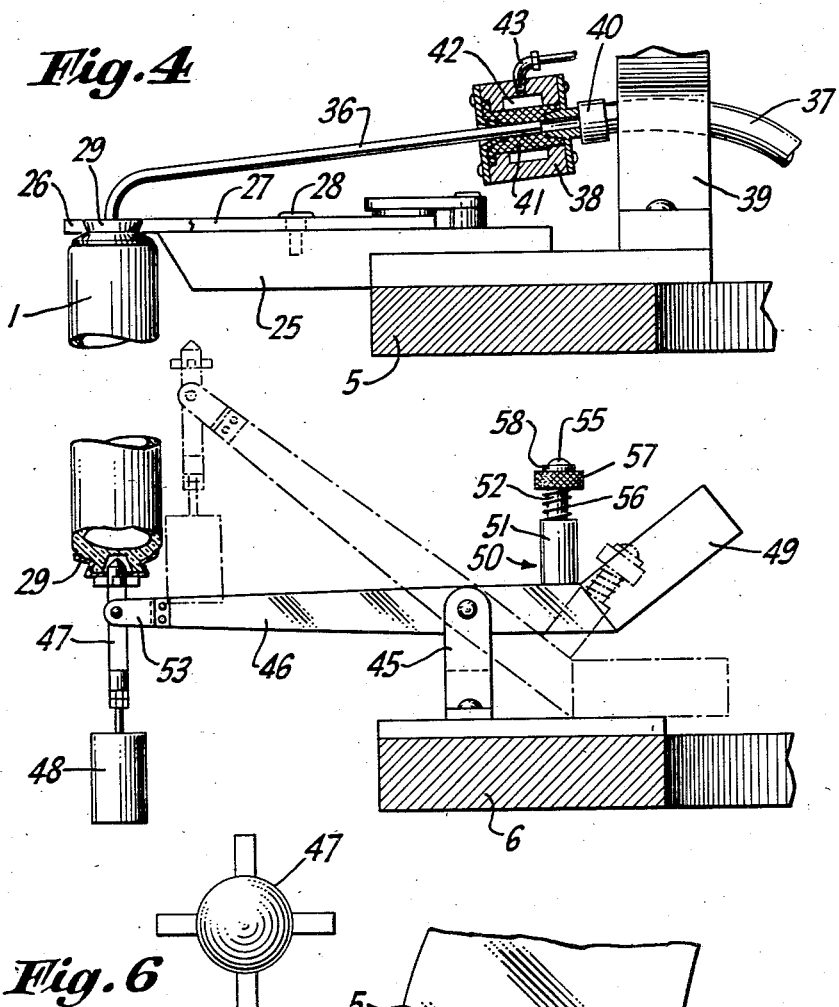
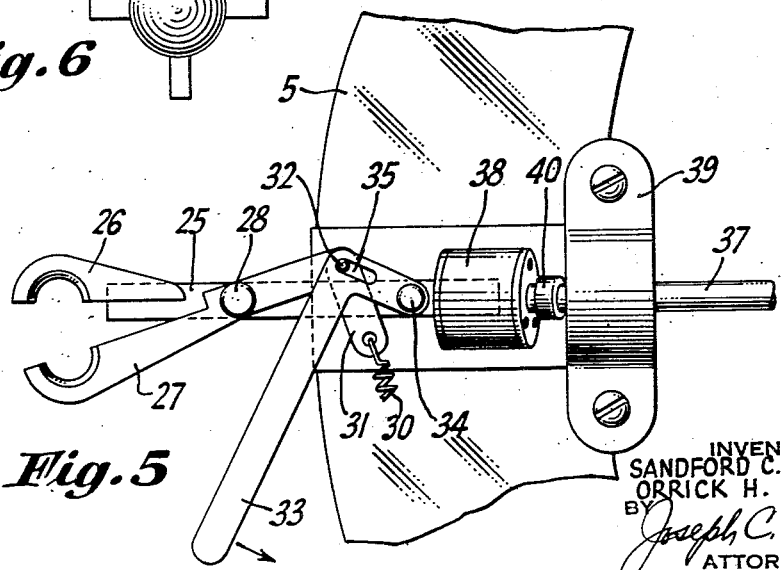

United States Patent Office 2,698,501
Patented Jan. 4, 1955

2,698,501

APPARATUS FOR BENDING LINEAR GLASS TUBING

Sandford C. Peek, Jr., Salem, and Orrick H. Biggs, Beverly, Mass., assignors to Sylvania Electric Products Inc., Salem, Mass., a corporation of Massachusetts Application December 13, 1950, Serial No. 200,621

9 Claims. (Cl. 49—7)

This invention relates to apparatus for bending linear glass tubing into arcuate shape and more particularly to apparatus for bending linear tubular fluorescent lamps into circular shape.

In the manufacture of circular fluorescent lamps from linear glass tubes, a proper heating of the tubes to permit satisfactory deformation to a circular configuration is a most important consideration. The linear glass tubes must be heated sufficiently to enable the deformation thereof to be accomplished with the application of a minimum force thereto and the setting up of a minimum strain therein. On the other hand, care must be exercised to prevent the tubes from being heated to a point where a control of their shape may be lost. Since the linear tubes must be heated to a temperature sufficient to effect a slight elongation thereof in order to insure satisfactory rolling and to avoid excessive strains being set up, it is apparent that the temperature range between this degree of heating and that at which loss of control over linearity and cross-sectional shape may occur is not very great.

One method of bending linear glass tubes into circular configuration embodies the idea of not only heating the tubes at several stations on a rolling machine, prior to the rolling station, but also heating the tubes at the rolling station. Another method involves even further heating, viz., heating the tubes while they are being rolled. There are several disadvantages in both of these methods; additional mechanisms are required and the speed with which the machine may be operated is decreased by the operating time required by these additional mechanisms. Another important disadvantage which characterizes the method in which the tubes are heated at the rolling station prior to effectuation of the actual rolling operation is the inherent inefficiency of the method. When a tube is being heated at the rolling station prior to rolling, the rolling mechanism is not operating on a tube; and when a tube is being rolled, the heating mechanism at the rolling station is not operating on a tube.

In accordance with our invention a linear glass tube is held by a holder and seated on a support and moved through a plurality of stations at which heating of the tube is effected. This heating operation is continued until the tube elongates a predetermined amount calculated to insure the desired plasticity for the rolling operation. The tube is then moved to the rolling station where the lower end thereof is grasped by the rolling mechanism and the rolling operation is effected, the tube support swinging clear of the rolling mechanism as the roller moves upwardly. Upon completion of the rolling operation, the roller is dis-engaged from the tube and the tube is then carried through the remaining stations to the unloading station.

Since the tube is seated on a support, as well as held by a holder, it can be heated sufficiently at the heating stations to permit it to be moved from the last heating station to the rolling station without the necessity for additional heating at the rolling station. The tube support also insures proper disposition of the tube, when it reaches the rolling station, for engagement of the lower end thereof by the jaws on the periphery of the tube roller, thereby eliminating the necessity for additional aligning mechanisms. Thus, in the apparatus of this invention, a tube is ready for execution of the rolling operation as soon as it reaches the rolling station.

An object of this invention is to provide an apparatus for accurately and uniformly bending linear glass tubes into true circular shape.

Another object is to provide an apparatus for bending linear glass tubes in which maximum efficiency of use of the mechanisms employed is attained.

Further objects, advantages and features of the invention will be apparent from the following description of a specific embodiment thereof and from the accompanying drawings in which:

Figure 3 is a sectional elevational view taken along the line 3—3 of Figure 1 showing a lamp in position for the rolling operation.

Figure 4 is an enlarged fragmentary elevational view partly in section, taken along the line 4—4 of Figure 1 showing a lamp held by the lamp holder and seated on the lamp support. The lamp support is shown in phantom in the inoperative position.

Figure 5 is a plan view of the lamp holder and its associated mechanisms.

Figure 6 is a plan view of the head of the lamp support showing its configuration.

Figure 7 is a fragmentary sectional plan view taken along the line 7—7 of Figure 3 showing the lamp rolling mechanism and its relationship to the machine turret.

Figure 8 is a detailed sectional view taken along the line 8—8 of Figure 7 showing a system of cams and levers for actuating the discs which comprise the lamp roller.

Figure 9 is an enlarged fragmentary elevational view of the lamp rolling apparatus and the lamp support showing their relationship to one another when no lamp is present on the lamp support.

Figure 1:
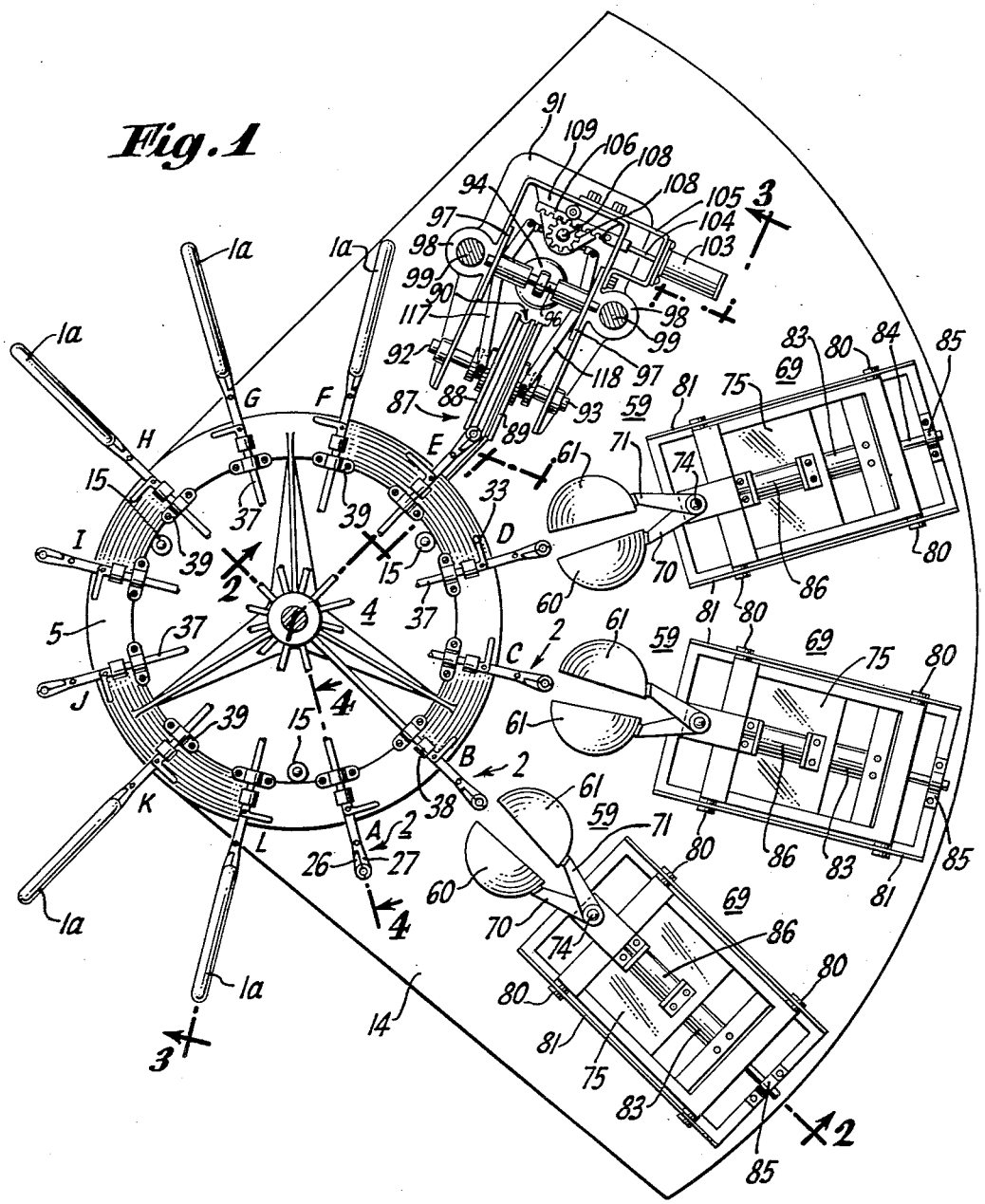
Figure 1 is a plan view partly in section of an apparatus for bending linear fluorescent lamps into circular shape.
Figure 2:
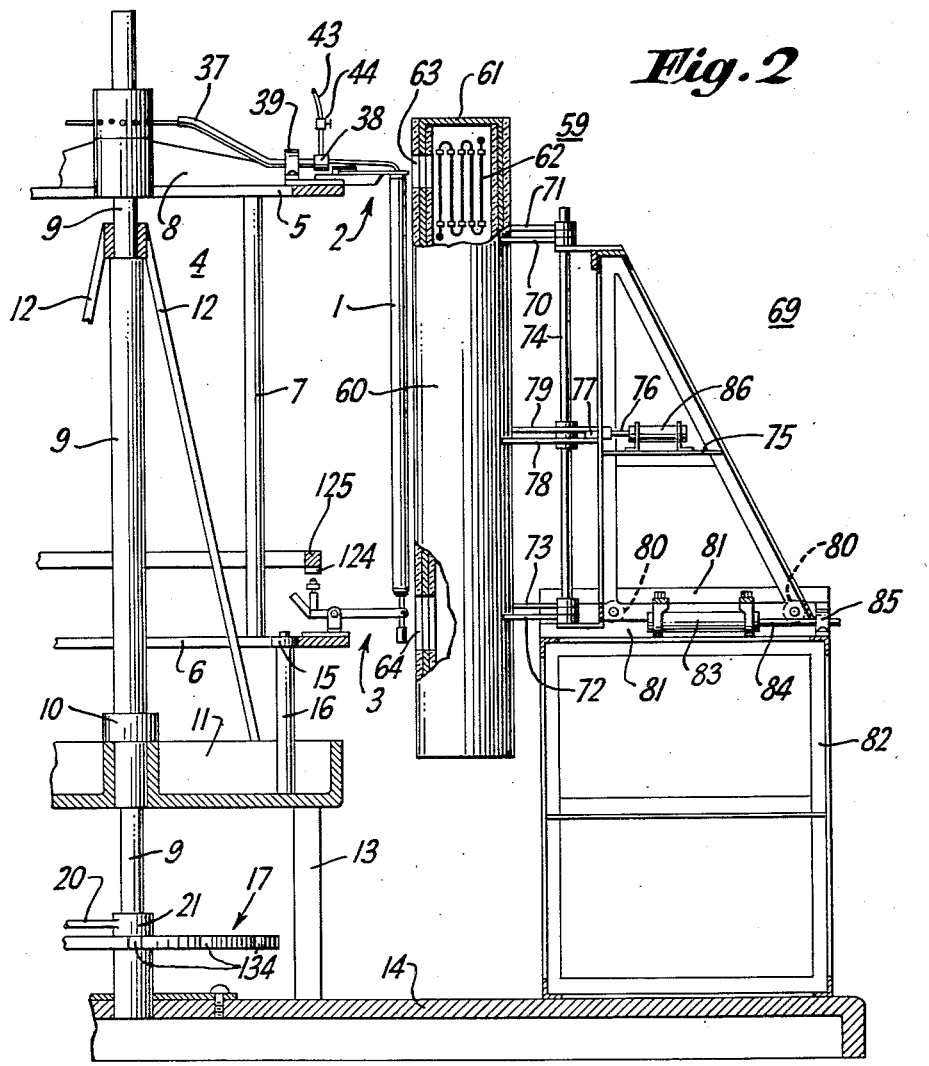
Figure 2 is a sectional elevational view taken along the line 2—2 of Figure 1 showing the relation of an oven with respect to the turret of the machine.

Referring now to the specific embodiment of our invention illustrated in the drawings, particularly Figures 1, 2 and 3 thereof, a linear fluorescent lamp 1, held by a lamp holder 2 and seated on a lamp support 3, is carried through a plurality of work stations at which the lamp is heated and finally deformed to the desired configuration. Movement of a lamp 1 through a plurality of work stations is effected on a rotatable turret type machine in which a plurality of lamp holders 2 and lamp supports 3 are mounted on a turret 4. The turret 4 comprises an upper ring plate 5, above the periphery of which the plurality of lamp holders 2 are mounted; a lower ring plate 6, about the periphery of which the plurality of lamp supports 3 are mounted; supporting columns 7 depending from the upper ring plate 5 and to the other ends of which the lower ring plate 6 is attached; and a spider 8 attached to the top of the upper ring plate 5. Rotation of the turret 4 is effected by a vertical drive shaft 9 upstanding on a pedestal 14. The shaft 9 extends through a base 11 and is journaled in the hub of the spider 8. The shaft 9 is maintained in a true vertical position by a thrust bearing 10 and a plurality of guides 12 upstanding from the base 11. The base 11 is mounted on legs 13 upstanding on the pedestal 14. Stability is imported to the turret 4, particularly the lower ring plate 6 thereof, by rollers 15 mounted on the tops of posts 16 mounted on the base 11. These rollers 15 engage the inside face of the lower ring plate 6 and aid in insuring true circular rotational movement of the turret 4.

The mechanism for actuating the drive shaft 9 is shown in Figure 3. This mechanism comprises a circular plate 17, having a plurality of slots 134 cut in the periphery thereof, mounted on the drive shaft 9, and a pair of air cylinders 18 and 19 which impart indexing rotational movement thereto. Air cylinder 18 is mounted on an arm 20. Arm 20 has a hub 21 on one end thereof through which the shaft 9 extends. The arm 20 is freely rotatable about the shaft 9. The arm 20 is provided with an aperture therein through which the piston rod 22 of the air cylinder 18 extends. A plug 23 is attached to the free end of the piston rod 22 and is engageable with the slots 134 in the circular plate 17. The air cylinder 19, which is mounted on the pedestal 14, has a finger 24 upstanding from the free end of its piston rod. The finger 24 extends through a slot formed in the free end of the arm 20.

Actuation of the drive shaft 9 to effect an indexing rotational movement of the turret 4 from one work station to another is accomplished by the mechanism just described. Air cylinder 18, connected to a source of air under pressure (not shown), is actuated and thereby causes the plug 23 attached to the free end of the piston rod 22 to enter one of the slots 134 in plate 17. Air cylinder 19, connected to a source of air under pressure (not shown), is then actuated. The power stroke of air cylinder 19 effects rotational movement of the arm 20 to which the piston rod of air cylinder 19 is connected by finger 24. Rotational movement of the arm 20 is transmitted through plug 23 and plate 17 to the turret drive shaft 9. When the turret 4 has been advanced one station, the plug 23 is disengaged from the plate 17 by the return stroke of the piston rod 22 of air cylinder 18, and the return stroke of the piston rod of air cylinder 19 effects a return of the arm 20 to its original starting position in readiness for effecting the next indexing movement of the turret 4.

As was mentioned above, the linear fluorescent lamp 1, held by the lamp holder 2 and seated on the lamp support 3, is carried through a plurality of work stations at which the lamp is heated and finally deformed to the desired configuration. As may be seen from the drawings, particularly Figures 4 and 5 thereof, the lamp holder 2 comprises an arm 25 fixed to the upper ring plate 5 of the turret 4, a fixed jaw 26 mounted on the outer end of the arm 25 and a moveable jaw 27 pivotally mounted at 28 on arm 25 intermediate its ends. The engaging faces of the jaws 26 and 27 have a semi-circular aperture cut therein which, when the jaws are closed, define a circular mouth which grips a metal cap 29 sealed on the end of the lamp 1. The jaw 27 is normally urged to the closed position by a spring 30, one end of which is fixedly attached to the upper ring plate 5 of the turret 4 and the other end of which is connected to the jaw 27 through link 31 and pin 32. Opening of the jaw 27 to permit insertion and withdrawal of a lamp is effected by rotation of a lever 33 in the direction indicated in Figure 5. The lever 33 is an L-shaped member pivotally mounted on the arm 25 at 34 and has an elongated slot 35 cut therein into which pin 32, which connects link 31 to jaw 27, extends. Counterclockwise rotation of lever 33 is transmitted into clockwise rotation of jaw 27 through pin 32 and link 31.

The lamp 1 has an exhaust tube 36 extending therefrom which, as is shown in the drawings, particularly Figure 4 thereof, is connected to a resilient hose 37 through a compression head 38. The resilient hose 37, which is connected to a vacuum pump (not shown) is threaded through a guide block 39 and has a coupling 40 on the end thereof through which it is connected to the compression head 38. The compression head 38 has a resilient rubber sleeve 41 seated therein and a chamber 42 surrounding it. The chamber 42 is connected to a source of air under pressure (not shown) through a hose 43. Regulation of the flow of air through hose 43 to the compression head 38 is accomplished by manipulation of valve 44 (Figures 2 and 3). In operation, the exhaust tube 36 is threaded into the resilient rubber sleeve in the compression head 38 and the valve 44 is opened to admit compressed air into the chamber 42 thereby causing rubber to flow and effect an air-tight seal. When the lamp forming operation effected on the apparatus of this invention has been completed, the valve 44 is closed thereby breaking the air-tight seal and freeing the exhaust tube 36 for removal from the compression head 38.

As was mentioned above, the lamp 1 is held by the lamp holder 2 and seated on lamp support 3. Referring to the drawings, particularly Figure 4 thereof, the lamp support 3, which is mounted on the lower ring plate 6 of the turret 4, comprises a bracket 45, a lever 46 pivotally mounted intermediate its ends in the bracket 45, a lamp-supporting head 47 pivotally mounted at 53 in the bifurcated portion of one end of the lever 46, a weight 48 hung from the lower end of the head 47, and a weight 49 attached to the other end of the lever 46. In the inoperative position, i. e., when no lamp is seated on the head 47, the lamp support assumes the position shown at the left in Figure 3 and in phantom in Figure 4, the weight 48 retaining the head 47 in the vertical position at all times.

A lamp elongation indicating device 50, the function and purpose of which will be described more fully below is mounted on top of the weight 49. This device comprises a boss 51 and a screw 52 threaded therein. The screw 52 has a lock spring 56 concentric therewith and a knurled head 57 on the top thereof, the knurled head having a boss 58 upstanding thereon which retains a spring loaded spherical contact 55.

Heating of the linear fluorescent lamp 1 is effected, in our preferred embodiment, in several separate ovens 59 disposed at work stations adjacent the periphery of the turret 4, although one large oven, spanning at least two work stations, may also be employed without departing from the spirit of our invention. Each oven 59 comprises a pair of semi-circular members 60 and 61 of insulating material which, when assembled, define a heating chamber, circular in cross-section, within which the lamp 1 is heated. The inside wall of each of the members 60 and 61 is provided with a plurality of heating elements 62, one of which is shown in Figure 2, disposed along the longitudinal axis thereof and connected to a source of electrical energy (not shown). Each of the members 60 and 61 is cut away at 63 and 64 to permit entrance of a portion of the lamp holder 2 and the lamp support 3.

Each oven 59 is supported from a carriage 69 by two pairs of arms 70 and 71, and 72 and 73 mounted on a vertical supporting shaft 74 on the carriage 69. Arms 70 and 72 are connected to oven member 60 and arms 71 and 73 are connected to oven member 61. Actuation of oven members 60 and 61 to open and close them with reference to one another is effected by an air cylinder 86 (connected to a source of air under pressure not shown) mounted on a shelf 75 on carriage 69. The piston rod 76 of the air cylinder 86 has a linkage mechanism 77 attached to the outside end thereof. Motion of the piston rod 76 is transmitted through this linkage mechanism 77 to a pair of levers 78 and 79 rotatably mounted on the supporting shaft 74. One end of each of the levers 78 and 79 is connected to the linkage mechanism 77 and the other end of each of the levers 78 and 79 is connected to oven members 60 and 61 respectively.

The carriage 69 is mounted on wheels 80 which ride on tracks 81 on carriage support 82. Reciprocating movement of the carriage 69 on the tracks 81 is effected by an air cylinder 83 (connected to a source of air under pressure not shown) mounted on the carriage 69. The outer end of the piston rod 84 of air cylinder 83 is fixed in a bracket 85 mounted on the carriage support 82. Thus, when air cylinder 83 is actuated, it moves along its fixed piston rod 84 and carries the carriage 69, on which it is mounted, with it.

As may be seen from the drawings, particularly Figures 1, 3 and 7 thereof, the lamp roller 87 comprises a pair of cooperating discs 88 and 89 which, when the adjacent faces thereof are brought into engagement with one another, define a mould 90 in their peripheries. Discs 88 and 89 are supported by a yoke 91 through shafts 92 and 93 respectively. Actuation of the yoke 91 to effect the power stroke of the lamp roller 87 is accomplished by an air cylinder 94 (connected to a source of air under pressure, not shown) mounted on pedestal 14. The piston rod 95 of the air cylinder 94 is connected to the yoke 91 through a rod 96 supported at its ends in a pair of rod supports 97 mounted on the sides of the yoke 91. The yoke 91 has a pair of bosses 98 formed in the sides thereof through which yoke-guiding columns 99 extend. When actuated, the yoke 91 rides up and down on these columns 99. The columns 99 are mounted in bases 100 on the pedestal 14 and are connected to one another at the top by a bracket 101 which insures the maintenance of a fixed spacing between the two columns at all times. Further rigidity is imparted to these two columns 99 by an arm 102 which connects the bracket 101 to the top of the turret 4. Collars 123, fixed on the columns 99, serve as a stop for the yoke 91 on its return stroke.

In their inoperative position, the discs 88 and 89, which comprise the lamp roller 87, normally are spaced from one another as shown in Figure 7. In their operative position, as shown in Figure 1, the discs 88 and 89 are in engagement with one another and define a mould 90 in their peripheries in which the lamp is formed. Actuation of the discs 88 and 89 is effected by means of an air cylinder 103 (connected to a source of air under pressure, not shown) mounted in a bracket 105 on a side of the yoke 91. The piston rod 104 of the air cylinder 103 is connected, through a motion translating mechanism mounted on the yoke 91 to the lamp roller 87. This motion translating mechanism comprises a rack 106 attached to the piston rod 104 of the air cylinder 103, a gear 107 in mesh therewith and mounted on a shaft 108 which is supported by and extends through shelves 109 and 110 in yoke 91 (Fig. 8).

Referring now to Figures 7 and 8, an eccentric cam 111 on shaft 108 has a collar 112 mounted thereon, to one end of which a connecting rod 113 is connected. A collar 114 is also mounted on shaft 108 and it is connected through pivot pin 115 to connecting rod 116. Referring now to Figure 7, connecting rods 113 and 116 are pivotally connected at their other ends to an end of levers 117 and 118 respectively. The levers 117 and 118 are pivotally mounted intermediate their ends at 119 and 120 respectively in the sides of yoke 91, and their other ends are pivotally connected to hubs 121 and 122 on discs 88 and 89 respectively.

For convenience in describing the operations performed by the several mechanisms just described, the work stations have been identified by reference letters in Figure 1. Station A is the lamp loading station. Stations B, C and D are lamp heating stations. Station E is the lamp rolling station. Stations F through K are lamp cooling stations. At station L the finished lamp is removed. In order to prevent contamination of the fluorescent powder with which the inside wall of the lamp envelope is provided and to prevent oxidation of the lamp electrodes, the lamp 1 is evacuated through the resilient hose 37 (Fig. 4) and an inert gas, such as argon, for example, is introduced during the heating of the lamp. During the actual rolling operation an inert gas is introduced to puff out the elongated plastic lamp to the proper cross-sectional configuration.

Referring to the drawings, particularly Figure 4 thereof, at station A, an operator loads a linear fluorescent lamp 1 on the machine by positioning the lower end thereof on the head 47 of the lamp support 3 and pushing the lamp downwardly and guiding its upper end into the fixed jaw 26 of the lamp holder 2. The moveable jaw 27, which at this moment is in the open position as shown in Figure 5, is then moved to the closed position by rotation of the lever 33 in a counter-clockwise direction, thereby effecting a gripping of the lamp between the jaws 26 and 27. The operator then draws the compression head 38, which floats on the end of the resilient hose 37, down over the lamp exhaust tube 36, making sure that the exhaust tube 36 extends a substantial distance into the resilient rubber sleeve 41 in the head 38 as shown in Figure 4. The operator then opens the valve 44 (Figures 2 and 3) on the hose 43 and thereby permits entry of compressed air into the chamber 42 (Figure 4) and flow of the rubber sleeve 41 to effect an air-tight seal between the sleeve 41 and the lamp exhaust tube 36. The lamp is now mounted and ready to be heated.

The turret 4 is then indexed to move the lamp 1 to station B (Figure 2) where the oven carriage 69, actuated by its air cylinder 83, moves inwardly and causes the members 60 and 61 of the oven 59 to envelop the lamp. The oven members 60 and 61 are then actuated by their air cylinder 86 to effect a closing thereof to one another.

As was mentioned above, the oven 59 in which the lamp 1 is heated is provided with a plurality of separate heating elements 62 spaced from one another along the longitudinal axis thereof. A plurality of separate heating elements 62, each of which is provided with separate controls, is preferable over a single heating means or a plurality thereof with a common control because this arrangement enables adjustments to be made in the amount of heat being supplied at several areas along the longitudinal axis of the lamp. More accurate control to insure uniform heating of the lamp is thereby assured.

After the lamp 1 has been heated at station B it is moved to station C for further heating. At station D, where still further heating is effected, the lamp 1 gets hot enough for elongation thereof to occur. Since the lamp is hung from the lamp holder 2 and merely rests on the lamp support 3, elongation of the lamp effects a downward movement of the lamp support head 47 and a consequent upward movement of the lamp elongation indicating device 50. The lamp elongation indicating device 50, in combination with a switch contact 124 on a switch contact ring 125 mounted on and encircling the supporting columns 7 of the turret 4 (Figures 2 and 3) and an electrical relay system (not shown) operates to terminate the heating of the lamp at station D when a pre-determined elongation has occurred. As the lamp support head 47 moves downwardly and the lamp elongation indicating device 50 moves upwardly under the influence of lamp elongation, the spherical metal contact 55 touches the switch contact 124 and closes an electrical circuit therethrough. The turret indexing mechanism and the oven actuating mechanism are both controlled by this circuit. Thus the turret 4 will not index and the ovens 59 will not be withdrawn before sufficient elongation has occurred in any given case. So also, the dwell period is not permitted to be excessively long and thereby result in over-heating of the lamp.

Thus the lamp elongation indicating device 50 automatically triggers the electrical circuit which controls the turret indexing mechanism. However, since this automatic triggering of the electrical circuit occurs only when a lamp is present at station D, to start the machine the circuit is triggered manually until the first lamp positioned on the machine has been carried from station A to station D.

When the circuit through the switch contact 124 is closed by engagement thereof by the spherical metal contact 55 of the lamp elongation indicating device 50, the air cylinder 86 is actuated to open the oven 59, the air cylinder 83 is actuated to retract the oven-carrying carriage 69 and the air cylinders 18 and 19 are actuated to effect an indexing of the turret 4. The lamp 1 now moves to station E where the lamp rolling operation is performed. As may be seen from the drawings, particularly Figures 1 and 7, the lamp roller 87 is disposed at an angle of about 20° to a radius from the turret 4, thereby eliminating the necessity for mounting the roller and yoke assembly on a carriage and moving it into and out of operating position.

When the lamp 1 comes to rest at station E, the discs 88 and 89 of the lamp roller 87 (Figure 7), actuated by the air cylinder 103, move into engagement with one another, with the pin 126 on the face of disc 89 entering the socket 127 in disc 88 thereby locking the discs together, and with the jaws 128 on the periphery of the discs 88 and 89 gripping the metal cap 29 on the end of the lamp 1. The air cylinder 94 is then actuated to effect the upward stroke of the yoke 91 (Figure 3). The disc 89, which is spring-loaded, is driven by a strap 129, thereby effecting rotation of the lamp roller 87 during this upward stroke of the yoke 91. The strap 129 is wound about the periphery of the disc 89, one end thereof being attached thereto and the other end being attached to a bracket 130 mounted on the base 11. Since the lower end of the lamp 1 is held in the mould 90 of the lamp roller 87 by the jaws 128, the lamp is wound thereabout during the upward rotational stroke of the roller 87. Since the curve traced by the jaws 128 in the upward stroke of the roller 87 is cycloidal, the lamp-supporting head 47 is pushed downwardly slightly during the initial portion of this stroke. This downward movement of the head 47 is translated through the lever 46 into upward movement of the lamp elongation indicating device 50 where it is absorbed by the spring-loaded contact 55.

Upon completion of the upward stroke of the lamp roller 87 and the winding of the lamp 1 thereon, a short dwell period is provided to make sure that the lamp has set before the discs 88 and 89 of the roller 87 are parted. Parting of the discs 88 and 89 is effected by the return stroke of the air cylinder 103. When the discs 88 and 89 part, rotation of spring-loaded disc 89 to its starting position is effected by its drive strap 129 which is rewound thereon by the return stroke of the yoke 91. Thus, upon completion of the return stroke of the yoke 91, the jaws 128 on the periphery of the discs 88 and 89 have been returned to the proper position for gripping the end of the next lamp when it moves into the rolling station.

When the discs 88 and 89 part, the circular lamp, which has been designated by the reference character 1a, is held by the lamp holder 2 (Figures 1 and 3). Further support may be given to the circular lamp 1a, as it moves through cooling stations, F, G, H, I, J and K, by the use of a suitable supporting arm (not shown) which may be mounted on the bottom face of the upper ring plate 5 and caused to engage the periphery of the circular lamp 1a after the discs 88 and 89 have parted at station E. At station L, the completed lamp is removed.

Certain features of the oven disclosed herein are described and claimed in the co-pending application of Robert E. Shaw et al., entitled "Oven Construction," filed of even date herewith, bearing Serial Number 200,622, now Patent No. 2,637,754, and assigned to the same assignee as this application.

Certain features of the compression head disclosed herein are described and claimed in the co-pending application of Oliver Mann, entitled "Exhaust Head," filed of even date herewith, bearing Serial Number 200,527, now Patent No. 2,661,964, and assigned to the same assignee as this application.

What we claim is:

1. Apparatus for bending a linear glass tube into arcuate shape, said apparatus comprising: a turret for carrying the tube to a plurality of work stations; a plurality of tube holders disposed about the periphery of said turret, each of said tube holders gripping a tube at one end thereof; a plurality of tube supports disposed about the periphery of said turret, each of said tube supports being located beneath and in register with each of said tube holders, and on which the other end of the tube is seated; means at at least one of said work stations for heating said tube to a plastic condition; and means at a station subsequent to the last heating station for bending the heated linear glass tube into arcuate shape, said means comprising a mould, means on said mould for grasping the lower end of said tube, and means for simultaneously rotating said mould and rolling it along said tube longitudinally thereof.

2. Apparatus for bending a linear glass tube into arcuate shape, said apparatus comprising: a turret for carrying the tube to a plurality of work stations; a plurality of tube holders disposed about the periphery of said turret, each of said tube holders gripping a tube at one end thereof; a plurality of tube supports disposed about the periphery of said turret, each of said tube supports being located beneath and in register with each of said tube holders, and each of said tube supports comprising a lever pivotally mounted intermediate its ends, a head, on which the other end of the tube is seated, mounted on said lever at an end thereof, and a weighted member mounted on said lever at the other end thereof; means at at least one of said work stations for heating said tube to a plastic condition; and means at a station subsequent to the last heating station for bending the heated linear glass tube into arcuate shape, said means comprising a mould, means on said mould for grasping the lower end of said tube, and means for simultaneously rotating said mould and rolling it along said tube longitudinally thereof.

3. Apparatus for bending a linear glass tube into arcuate shape, said apparatus comprising: a turret for carrying the tube to a plurality of work stations; a plurality of tube holders disposed about the periphery of said turret, each of said tube holders gripping a tube at one end thereof; a plurality of tube supports disposed about the periphery of said turret, each of said tube supports being located beneath and in register with each of said tube holders, and each of said tube supports comprising a lever pivotally mounted intermediate its ends, a head, on which the other end of the tube is seated, pivotally mounted on said lever at an end thereof, means for maintaining said pivotally mounted head in a vertical plane, and a weighted member mounted on said lever at the other end thereof; means at at least one of said work stations for heating said tube to a plastic condition; and means at a station subsequent to the last heating station for bending the heated linear glass tube into arcuate shape, said means comprising a mould, means on said mould for grasping the lower end of said tube, and means for simultaneously rotating said mould and rolling it along said tube longitudinally thereof.

4. Apparatus for bending a linear glass tube into arcuate shape, said apparatus comprising: a turret for carrying the tube to a plurality of work stations; a plurality of tube holders disposed about the periphery of said turret, each of said tube holders gripping a tube at one end thereof; a plurality of tube supports disposed about the periphery of said turret, each of said tube supports being located beneath and in register with each of said tube holders, and on which the other end of the tube is seated; a tube elongation indicating device mounted on each of said tube supports; means at at least one of said work stations for heating said tube to a plastic condition; and means at a station subsequent to the last heating station for bending the heated linear glass tube into arcuate shape, said means comprising a mould, means on said mould for grasping the lower end of said tube, and means for simultaneously rotating said mould and rolling it along said tube longitudinally thereof.

5. Apparatus for bending a linear glass tube into arcuate shape, said apparatus comprising: a turret for carrying the tube to a plurality of work stations; a plurality of tube holders disposed about the periphery of said turret, each of said tube holders gripping a tube at one end thereof; a plurality of tube supports disposed about the periphery of said turret, each of said tube supports being located beneath and in register with each of said tube holders, and each of said tube supports comprising a lever pivotally mounted intermediate its ends, a head, on which the other end of the tube is seated, mounted on said lever at an end thereof, and a weighted member mounted on said lever at the other end thereof; a tube elongation indicating device mounted on each of said tube supports; means at at least one of said work stations for heating said tube to a plastic condition; and means at a station subsequent to the last heating station for bending the heated linear glass tube into arcuate shape, said means comprising a mould, means on said mould for grasping the lower end of said tube, and means for simultaneously rotating said mould and rolling it along said tube longitudinally thereof.

6. Apparatus for bending a linear glass tube into arcuate shape, said apparatus comprising: a turret for carrying the tube to a plurality of work stations; a plurality of tube holders disposed about the periphery of said turret, each of said tube holders gripping a tube at one end thereof; a plurality of tube supports disposed about the periphery of said turret, each of said tube supports being located beneath and in register with each of said tube holders, and each of said tube supports comprising a lever pivotally mounted intermediate its ends, a head, on which the other end of the tube is seated, pivotally mounted on said lever at an end thereof, means for maintaining said pivotally mounted head in a vertical plane, and a weighted member mounted on said lever at the other end thereof; a tube elongation indicating device mounted on each of said tube supports; means at at least one of said work stations for heating said tube to a plastic condition; and means at a station subsequent to the last heating station for bending the heated linear glass tube into arcuate shape, said means comprising a mould, means on said mould for grasping the lower end of said tube, and means for simultaneously rotating said mould and rolling it along said tube longitudinally thereof.

7. Apparatus for bending a linear glass tube into arcuate shape, said apparatus comprising: a turret for carrying the tube to a plurality of work stations; a plurality of tube holders disposed about the periphery of said turret, each of said tube holders gripping a tube at one end thereof; a plurality of tube supports disposed about the periphery of said turret, each of said tube supports being located beneath and in register with each of said tube holders, and on which the other end of the tube is seated; a tube elongation indicating device mounted on each of said tube supports; a contact ring mounted on said turret about the periphery thereof and intermediate said tube holders and said tube supports, said contact ring having a plurality of switch contacts mounted on the bottom face thereof and engageable by said tube elongation indicating devices; means at at least one of said work stations for heating said tube to a plastic condition; and means at a station subsequent to the last heating station for bending the heated linear glass tube into arcuate shape, said means comprising a mould, means on said mould for grasping the lower end of said tube, and means for simultaneously rotating said mould and rolling it along said tube longitudinally thereof.

8. Apparatus for bending a linear glass tube into arcuate shape, said apparatus comprising: a turret for carrying the tube to a plurality of work stations; a plurality of tube holders disposed about the periphery of said turret, each of said tube holders gripping a tube at one end thereof; a plurality of tube supports disposed about the periphery of said turret, each of said tube supports being located beneath and in register with each of said tube holders, and each of said tube supports comprising a lever pivotally mounted intermediate its ends, a head, on which the other end of the tube is seated, mounted on said lever at an end thereof, and a weighted member mounted on said lever at the other end thereof; a tube elongation indicating device mounted on each of said tube supports; a contact ring mounted on said turret about the periphery thereof and intermediate said tube holders and said tube supports, said contact ring having a plurality of switch contacts mounted on the bottom face thereof and engageable by said tube elongation indicating devices; means at at least one of said work stations for heating said tube to a plastic condition; and means at a station subsequent to the last heating station for bending the heated linear glass tube into arcuate shape, said means comprising a mould, means on said mould for grasping the lower end of said tube and means for simultaneously rotating said mould and rolling it along said tube longitudinally thereof.

9. Apparatus for bending a linear glass tube into arcuate shape, said apparatus comprising: a turret for carrying the tube to a plurality of work stations; a plurality of tube holders disposed about the periphery of said turret, each of said tube holders gripping a tube at one end thereof; a plurality of tube supports disposed about the periphery of said turret, each of said tube supports being located beneath and in register with each of said tube holders, and each of said tube supports comprising a lever pivotally mounted intermediate its ends, a head on which the other end of the tube is seated, pivotally mounted on said lever at an end thereof, means for maintaining said pivotally mounted head in a vertical plane, and a weighted member mounted on said lever at the other end thereof; a tube elongation indicating device mounted on each of said tube supports; a contact ring mounted on said turret about the periphery thereof and intermediate said tube holders and said tube supports, said contact ring having a plurality of switch contacts mounted on the bottom face thereof and engageable by said tube elongation indicating devices; means at at least one of said work stations for heating said tube to a plastic condition; and means at a station subsequent to the last heating station for bending the heated linear glass tube into arcuate shape, said means comprising a mould, means on said mould for grasping the lower end of said tube, and means for simultaneously rotating said mould and rolling it along said tube longitudinally thereof.

References Cited in the file of this patent

UNITED STATES PATENTS

| Number | Name | Date |
| --- | --- | --- |
| 1,493,044 | Leiman | May 6, 1924 |
| 2,146,572 | Hahn et al. | Feb. 7, 1939 |
| 2,270,152 | Themak | Jan. 13, 1942 |
| 2,494,872 | Greiner et al. | Jan. 17, 1950 |
| 2,494,923 | Yoder et al. | Jan. 17, 1950 |
| 2,611,216 | Snow et al. | Sept. 23, 1952 |